(No Model.) 2 Sheets—Sheet 1.

H. W. LIBBEY.
ELECTRIC LOCOMOTIVE.

No. 506,786. Patented Oct. 17, 1893.

(No Model.) 2 Sheets—Sheet 2.
H. W. LIBBEY.
ELECTRIC LOCOMOTIVE.
No. 506,786. Patented Oct. 17, 1893.
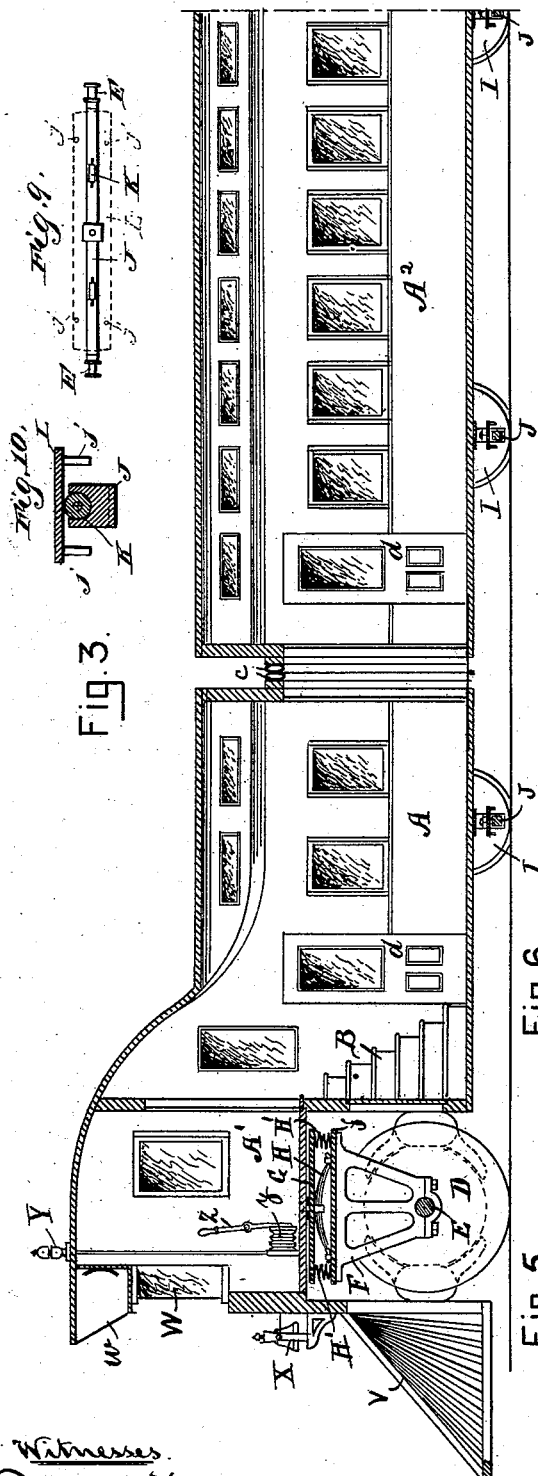
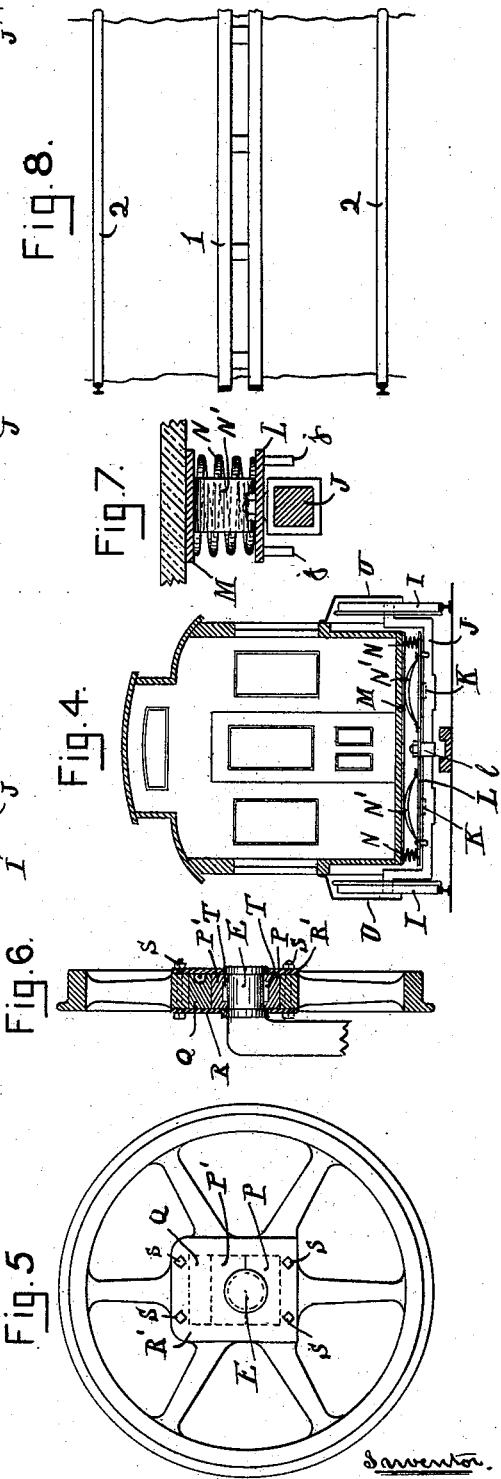

UNITED STATES PATENT OFFICE.

HOSEA W. LIBBEY, OF BOSTON, MASSACHUSETTS.

ELECTRIC LOCOMOTIVE.

SPECIFICATION forming part of Letters Patent No. 506,786, dated October 17, 1893.

Application filed April 21, 1892. Serial No. 430,076. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Locomotives for Electric Railroads and Tracks for the Same, of which the following, taken in connection with the accompanying drawings, is a specification.

My invention relates to certain improvements in electric rail roads, and it consists in the peculiar construction of the engine and the tracks for same as hereinafter fully described and pointed out in the claims, reference being had to the accompanying drawings, in which—

Figure 1:
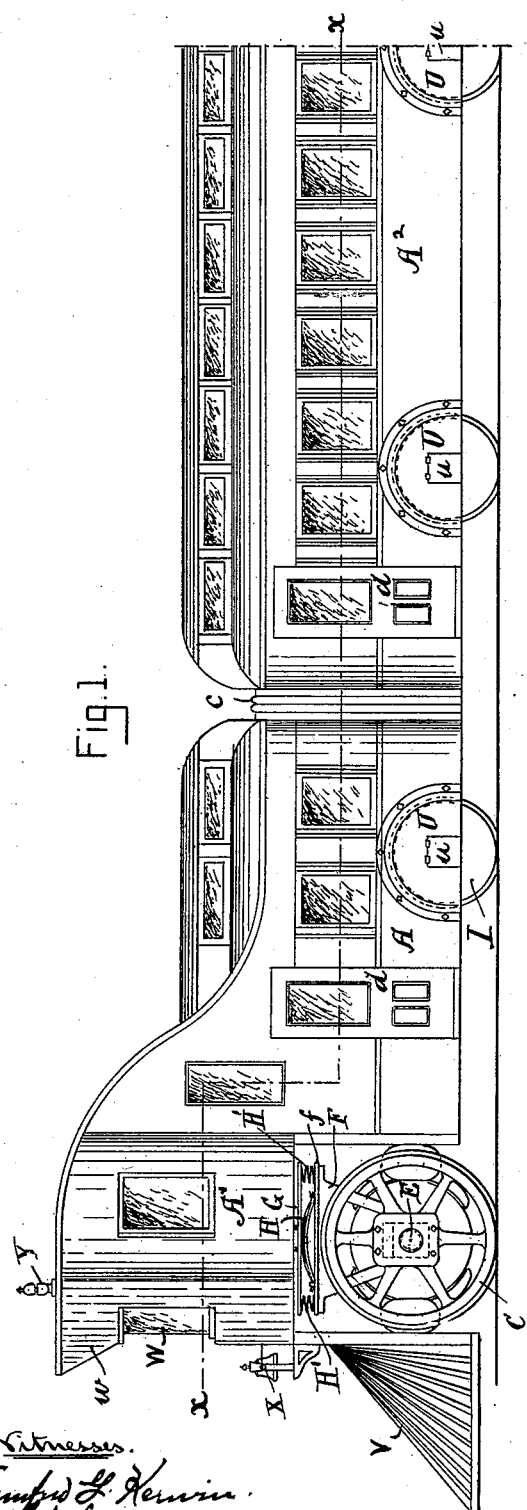
Figure 2:
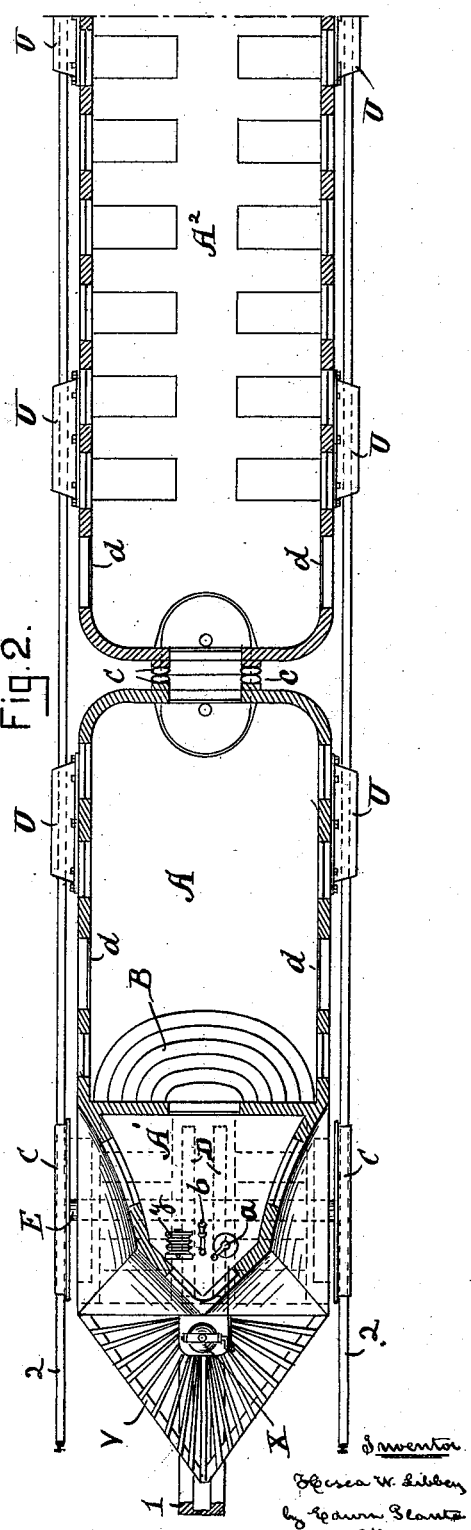

Figure 1—represents a side view of the body of an electric locomotive and a portion of a passenger car embodying my invention. Fig. 2—is a horizontal section taken on line $x, x$, of Fig. 1. Fig. 3—is a horizontal section through the engine body and car. Fig. 4—is a transverse vertical section through the rear portion of the body of the engine. Fig. 5—is a side view of one of the wheels, and its bearings. Fig. 6—is a vertical section through the same. Fig. 7—is a detail view of the axle, of one of the rear wheels, the plate and spring connections to the same. Fig. 8—is a plan view of a portion of the track. Fig. 9 is a plan or top view of the bent axle. Fig. 10 is a sectional detail view through the bent axle roller and plate.

A, represents the electric locomotive body, the forward end A', of which is raised above the level of the body floor proper, and which raised portion forms a compartment for the engineer, and it is reached by a flight of steps B. The forward end of this locomotive car is of a wedge shape so as to cut the air when in motion thereby reducing the resistance and it is carried by two large driving wheels C, C, and two feed wheels D, D, mounted upon a straight axle E, to which are secured frames F, to the upper portions of which is attached a plate $f$, and to the under side of the floor of the compartment A', is fulcrumed a plate G, and interposed between and secured to the plates G and $f$ is a series of elliptical and spiral springs H, H', or any other suitable form of spring as may be desired.

Upon the axle E is secured an armature or armatures of a dynamo machine, the magnets being secured to the body of the car on each side as shown in dotted lines, but as any suitable motor may be employed no particular electric motor is shown.

The rear portion of the locomotive body is carried by two wheels I, I, mounted upon a bent axle J, see Fig. 4. In the portion of the axle that passes under the car are formed two recesses in each of which is placed an antifriction rollers K, that help to support a plate L, and prevent its tilting to one side or the other. These rollers work against the under side of the plate L, which is fulcrumed in its center at $l$, to the axle J. To the under side of the car over the plate L is secured a plate M, spiral springs N, and elliptical springs N', being interposed between the plates L and M. Pins or stops $j$, are secured to the plate L, so as to limit the amount of travel of the axle J. The wheels I rotate upon the axle J, outside of the sides of the car, and are held in place as shown in Figs. 5 and 6, that is to say the hub of the wheel is formed with a rectangular opening in which is placed a half brass or bearing P, upon which the axle rests. Then the other half brass or bearing P', is inserted in said opening and brought into contact with the axle where it is kept in place by a square block Q inserted over said brasses; the brass bearings and block are retained in place by two plates R, R', secured by bolts S, passing through the hub of the wheel. I prefer to insert antifriction rollers T, in the brasses P, P', which rollers are in contact with the axle. It will be seen by this construction that the bearings P, P', can be readily removed when worn, by simply taking off the plate R, and withdrawing the piece Q, and a new one replaced, or if required the wheel itself can be removed and a new one substituted without removing the axle.

To the side of the car over each wheel is secured a covering U, of thin sheet metal which is cut out at that portion that covers over the axle, the cut out portion being covered by a flap $u$, hinged to the cover U, so that when it is desired to supply lubricant to the bearing, the flap $u$ can be raised, and the lubricant applied.

To the forward end of the electric locomotive car is attached a cow catcher V, and to the front of the compartment A', is fitted with a window W, through which the engineer has an uninterrupted view of the track. Just over this window is arranged a chamber $w$, in which is placed a search head light which may be a lamp of any desired design, but preferably an electric light is employed which will be reflected so as to throw the light a considerable distance in advance of the train, and being above the head of the operator will give him a clear view of the track.

X, is a bell supported in any convenient manner so as to be operated by the motor man, and Y, is a whistle connected to a bellows $y$, that is operated by a hand lever $z$, or it might be arranged to be operated by the foot, if desired.

$a$, is the lever for operating the switch for regulating the electric current which is supplied from a central track or tracks 1, through the feed wheels D, to the motors through which it passes, and then by the axle E, through the driving wheels C, to the side rails 2, and thence to ground.

$b$, is the brake lever.

$A^2$, represents half of a passenger car mounted upon axles J, and wheels I, constructed as before described with reference to the rear portion of the locomotive body and is only shown to illustrate how the locomotive may be attached thereto. Doors $d$ are formed on the side of the body of the locomotive and the rear end of the body is provided with a doorway around which a suitable elastic contact piece $c$, is secured so that when secured to a car a tight joint will be formed between them. It will be seen that by this construction of electric locomotive body I am enabled to have the main portion of the floor of same very near the ground while at the same time very large driving wheels can be employed and the engineer has an elevated position whereby he can obtain an extensive view of the track.

In Fig. 8 I have shown a track constructed according to my invention, consisting of two outside rails 2, 2 which may be of rails of ordinary construction, and central rails 1, for conducting the electric current from the generator to the motor or motors. These rails I prefer to form double as shown, but if desired a single rail might be employed.

What I claim as my invention is—

1. A railway electric locomotive body the rear axle of which is carried by wheels mounted upon a bent axle, so that they extend a short distance below the bottom of the body the front portion being carried by large driving wheels on a straight axle that also carries a feed wheel or wheels for conducting electricity from a central rail or rails to a motor or motors mounted upon said shaft substantially as set forth.

2. A railway electric locomotive having a rear compartment A, and a front compartment A', above the level of the rear compartment, steps B, communicating between the same, a lamp chamber $w$, at the top of the forward end of the front portion, said locomotive car being mounted upon a bent axle at its rear, and a straight axle at its front end, and wheels all arranged substantially as set forth.

3. In combination in an electric locomotive a bent axle J, wheels I, journaled thereon, said axle being fulcrumed to a plate L, a plate M, and suitable springs interposed between the plates L M substantially as set forth.

4. In combination in an electric locomotive a bent axle J, wheels I, mounted thereon, each having a rectangular hub, the brasses P, P', lock piece Q, plates R, and bolts S, substantially as set forth.

5. In combination in an electric locomotive, a straight axle mounted in bearings having secured thereon two driving wheels, also a feed wheel or wheels and two sets of electro-magnets arranged between the feed wheel or wheels and the driving wheels substantially as set forth.

6. In a railroad for electric cars two outer rails for the driving wheels of the locomotive to run upon and a central rail or rails upon which a feed wheel or wheels run for supplying the electric current to two sets of electro magnets all the wheels and magnets being mounted upon the same axle substantially as set forth.

In testimony whereof I have signed my name to this specification, in the presence of two subscribing witnesses, on this 27th day of February, A. D. 1892.

HOSEA W. LIBBEY.

Witnesses:
CHAS. STEERE,
EDWIN PLANTA.